US011199149B2

(12) United States Patent
Takano et al.

(10) Patent No.: US 11,199,149 B2
(45) Date of Patent: Dec. 14, 2021

(54) DIAGNOSIS DEVICE FOR FUEL SUPPLY SYSTEM

(71) Applicant: HONDA MOTOR CO., LTD., Tokyo (JP)

(72) Inventors: Yuki Takano, Wako (JP); Ryosuke Ibata, Wako (JP); Tetsuya Kaneko, Wako (JP); Takahiro Kitamura, Wako (JP); Tsuyoshi Takizawa, Wako (JP); Shunji Akamatsu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 727 days.

(21) Appl. No.: 14/670,367

(22) Filed: Mar. 26, 2015

(65) Prior Publication Data

US 2015/0275804 A1 Oct. 1, 2015

(30) Foreign Application Priority Data

Mar. 31, 2014 (JP) ............................ JP2014-071300

(51) Int. Cl.
*F02D 41/14* (2006.01)
*F02D 41/22* (2006.01)
(Continued)

(52) U.S. Cl.
CPC ....... *F02D 41/1495* (2013.01); *F02D 41/003* (2013.01); *F02D 41/1456* (2013.01);
(Continued)

(58) Field of Classification Search
CPC .... F02D 41/1495; F02D 41/22; F02D 41/222; F02D 41/1456; F02D 2041/224
(Continued)

(56) References Cited

U.S. PATENT DOCUMENTS 5,094,214 A * 3/1992 Kotzan ............... F02D 41/1495 123/479
5,231,969 A * 8/1993 Suga ................... F02M 25/089 123/685

(Continued)

FOREIGN PATENT DOCUMENTS

CN 103080518 5/2013
EP 2392805 A1 * 12/2011 .......... F02D 41/065

(Continued)

OTHER PUBLICATIONS

Chinese Office Action for corresponding CN Application No. 201510137544.7, dated Jan. 3, 2017 (w/ English machine translation).

*Primary Examiner* — Logan M Kraft
*Assistant Examiner* — Joshua Campbell
(74) *Attorney, Agent, or Firm* — Mori & Ward, LLP

(57) ABSTRACT

A diagnosis apparatus of a fuel supply system includes an operation state detector, an air-fuel ratio sensor, a fuel injection amount calculator, a threshold value table, an abnormality information acquiring device, and an abnormality determining device. In the threshold value table, operation ranges of an internal combustion engine are provided based on an engine speed and a throttle opening. In the threshold value table, a lean side threshold value and a rich side threshold value of an air-fuel ratio correction factor to determine abnormality of the fuel supply system are set beforehand for each of the operation ranges. The abnormality information acquiring device is configured to determine whether the air-fuel ratio correction factor has exceeded the lean side threshold value or the rich side threshold value extracted from the threshold value table according to an operation state so as to acquire abnormality information.

11 Claims, 5 Drawing Sheets

(51) Int. Cl.
*F02D 41/00* (2006.01)
*F02D 41/30* (2006.01)
*F02M 25/08* (2006.01)

(52) U.S. Cl.
CPC ............. *F02D 41/22* (2013.01); *F02D 41/30* (2013.01); *F02D 41/0037* (2013.01); *F02D 2041/224* (2013.01); *F02D 2041/228* (2013.01); *F02M 25/089* (2013.01); *Y02T 10/40* (2013.01)

(58) Field of Classification Search
USPC .......................................................... 123/480
See application file for complete search history.

(56) References Cited

U.S. PATENT DOCUMENTS

| | | | | |
|---|---|---|---|---|
| 5,529,047 | A | 6/1996 | Aota et al. | |
| 5,542,404 | A * | 8/1996 | Hasegawa | F02D 41/008 123/690 |
| 5,605,135 | A * | 2/1997 | Netherwood | F02D 41/266 123/479 |
| 5,634,454 | A * | 6/1997 | Fujita | F02D 41/0037 123/690 |
| 5,964,208 | A * | 10/1999 | Yamashita | F02D 41/1456 123/674 |
| 6,502,543 | B1 * | 1/2003 | Arai | F01L 9/04 123/348 |
| 2006/0207558 | A1 * | 9/2006 | Tahara | F02D 41/221 123/431 |
| 2011/0239750 | A1 * | 10/2011 | Abe | F02D 19/12 73/114.45 |

FOREIGN PATENT DOCUMENTS

| | | | | |
|---|---|---|---|---|
| JP | 63124847 | A * | 5/1988 | |
| JP | 63124847 | A * | 5/1988 | |
| JP | 01-211637 | | 8/1989 | |
| JP | 06026894 | A * | 2/1994 | |
| JP | 06026894 | A * | 2/1994 | |
| JP | 2006258031 | A * | 9/2006 | F02D 41/1495 |
| JP | 2006258031 | A * | 9/2006 | F02D 41/1495 |
| JP | 2009-203973 | | 9/2009 | |

* cited by examiner

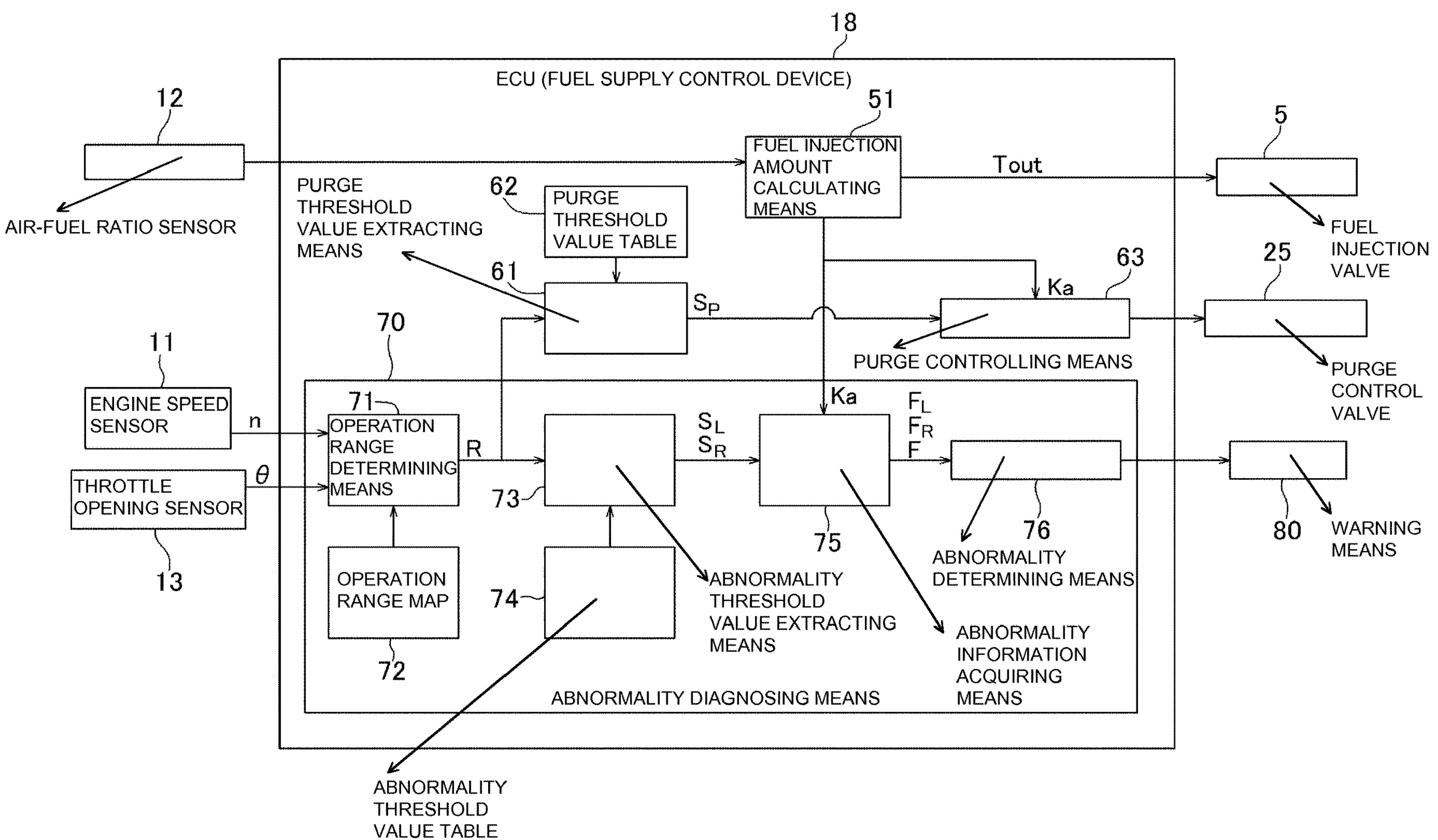

FIG. 2
18
ECU (FUEL SUPPLY CONTROL DEVICE)
12
AIR-FUEL RATIO SENSOR
51
FUEL INJECTION AMOUNT CALCULATING MEANS
Tout
5
FUEL INJECTION VALVE
PURGE THRESHOLD VALUE EXTRACTING MEANS
62
PURGE THRESHOLD VALUE TABLE
61
$S_P$
Ka
63
PURGE CONTROLLING MEANS
25
PURGE CONTROL VALVE
70
11
ENGINE SPEED SENSOR
n
THROTTLE OPENING SENSOR
θ
13
71
OPERATION RANGE DETERMINING MEANS
R
73
$S_L$
$S_R$
Ka
75
$F_L$
$F_R$
F
76
80
WARNING MEANS
OPERATION RANGE MAP
72
74
ABNORMALITY THRESHOLD VALUE EXTRACTING MEANS
ABNORMALITY DETERMINING MEANS
ABNORMALITY INFORMATION ACQUIRING MEANS
ABNORMALITY DIAGNOSING MEANS
ABNORMALITY THRESHOLD VALUE TABLE

DIAGNOSIS DEVICE FOR FUEL SUPPLY SYSTEM

CROSS-REFERENCE TO RELATED APPLICATIONS

The present application claims priority under 35 U.S.C. § 119 to Japanese Patent Application No. 2014-071300, filed Mar. 31, 2014, entitled "Diagnosis Device For Fuel Supply System." The contents of this application are incorporated herein by reference in their entirety.

BACKGROUND OF THE INVENTION

1. Field of the Invention

The present invention relates to a diagnosis device for a fuel supply system.

2. Discussion of the Background

In a fuel supply system of an internal combustion engine performing feedback control in which the air-fuel ratio is corrected to achieve a target air-fuel ratio by controlling the fuel injection valve based on a detected value of an air-fuel ratio sensor arranged in an exhaust system in order to optimize the air-fuel ratio by controlling the fuel amount supplied to the internal combustion engine, in order to keep the air-fuel ratio at the target value, the injection time of the fuel injection valve is corrected.

In JP-A No. H1-211637, an example of diagnosing abnormality of the fuel supply system by watching variation of the air-fuel ratio correction factor for correction of the injection time is disclosed.

In the abnormality diagnosis device disclosed in JP-A No. H1-211637, when the pressure for supplying the fuel to the fuel injection valve is increased, the air-fuel ratio shifts to the rich side, and therefore the value of the air-fuel ratio correction factor also changes so as to bring back the air-fuel ratio to a normal value.

Abnormality is diagnosed watching the degree of the variation of the air-fuel ratio correction factor.

SUMMARY OF THE INVENTION

According to one aspect of the present invention, a diagnosis device for a fuel supply system includes operation state detecting means, an air-fuel ratio sensor, and fuel injection amount calculating means. The operation state detecting means detects the operation state of an internal combustion engine. The air-fuel ratio sensor is arranged in an exhaust system of the internal combustion engine and detects the air-fuel ratio. The fuel injection amount calculating means calculates the fuel injection amount supplied to the internal combustion engine by a fuel injection valve based on detected information of the operation state detecting means. In the fuel injection amount calculating means, feedback is performed by the air-fuel ratio correction factor according to the air-fuel ratio detected by the air-fuel ratio sensor, the fuel injection amount is corrected, and fuel supply control is performed. The diagnosis device for a fuel supply system further includes a threshold value table, abnormality information acquiring means, and abnormality determining means. In the threshold value table, the operation range is divided based on an engine speed and a throttle opening, and a lean side threshold value and a rich side threshold value of an air-fuel ratio correction factor determining abnormality of the fuel supply system is set beforehand for every operation range. The abnormality information acquiring means determines whether or not the air-fuel ratio correction factor has exceeded the lean side threshold value or the rich side threshold value extracted from the threshold value table according to the operation state, and acquires abnormality information. The abnormality determining means determines abnormality based on the abnormality information acquired by the abnormality information acquiring means.

According to another aspect of the present invention, a diagnosis apparatus of a fuel supply system includes an operation state detector, an air-fuel ratio sensor, a fuel injection amount calculator, a threshold value table, an abnormality information acquiring device, and an abnormality determining device. The operation state detector is configured to detect an operation state of an internal combustion engine. The air-fuel ratio sensor is arranged in an exhaust system of the internal combustion engine and configured to detect an air-fuel ratio. The fuel injection amount calculator is configured to calculate an amount of fuel injected into the internal combustion engine by a fuel injection valve based on the operation state detected by the operation state detector and configured to perform feedback control so as to correct the amount of fuel based on an air-fuel ratio correction factor according to the air-fuel ratio detected by the air-fuel ratio sensor and so as to control fuel supply to the internal combustion engine. In the threshold value table, operation ranges of the internal combustion engine are provided based on an engine speed and a throttle opening. In the threshold value table, a lean side threshold value and a rich side threshold value of the air-fuel ratio correction factor to determine abnormality of the fuel supply system are set beforehand for each of the operation ranges. The abnormality information acquiring device is configured to determine whether the air-fuel ratio correction factor has exceeded the lean side threshold value or the rich side threshold value extracted from the threshold value table according to the operation state so as to acquire abnormality information. The abnormality determining device is configured to determine the abnormality of the fuel supply system based on the abnormality information acquired by the abnormality information acquiring device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 2 is a control block diagram of the fuel supply control device.

DESCRIPTION OF THE EMBODIMENTS

Figure 1:
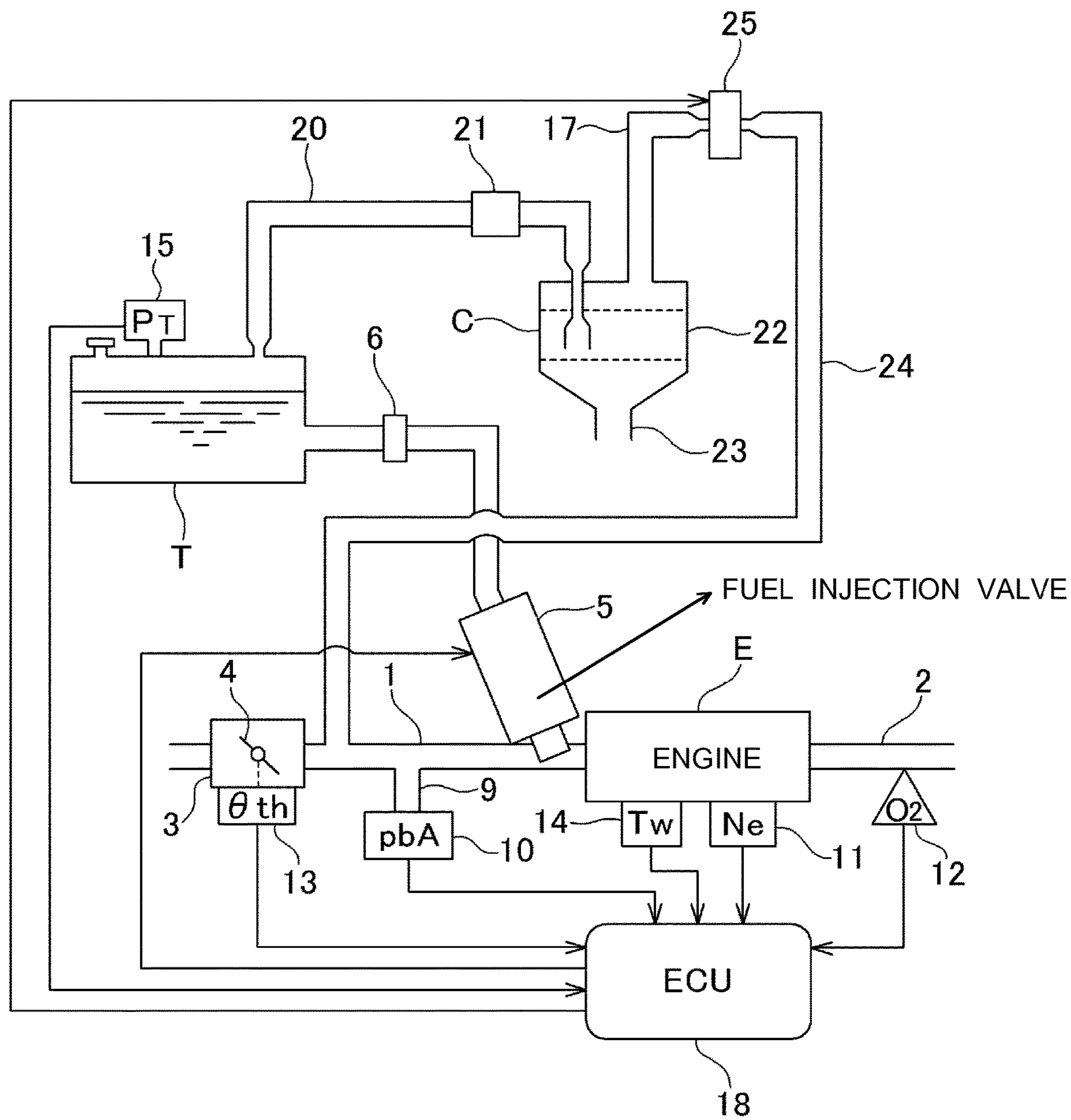
FIG. 1 is a total configuration diagram of a fuel supply control device of an embodiment of the present invention.

The embodiments will now be described with reference to the accompanying drawings, wherein like reference numerals designate corresponding or identical elements throughout the various drawings.

One embodiment of the present invention will be described below based on FIG. 1 to FIG. 5.

FIG. 1 is a total configuration diagram of a fuel supply control device in relation with the present embodiment.

In FIG. 1, an internal combustion engine E is an internal combustion engine in which a mixture gas of fuel and air is sucked from an intake pipe 1, power is obtained by combustion, and exhaust gas after combustion is discharged by an exhaust pipe 2, a throttle body 3 is formed in the middle of the intake pipe 1, a throttle valve 4 is disposed inside the throttle body 3, and a fuel injection valve 5 is arranged on the downstream side of the throttle valve 4 and slightly on the upstream side of an intake valve not illustrated of the internal combustion engine E.

The fuel injection valve 5 is connected to a fuel tank T through a fuel pump 6.

The operation state of such internal combustion engine E is configured to be detected by each load detecting means (operation state detecting means), an intake pipe absolute pressure sensor 10 detecting the absolute pressure PbA of the inside of the intake pipe 1 is arranged in a branch pipe 9 immediately downstream the throttle valve 4, the engine speed Ne (n) is detected by an engine speed sensor 11 attached to the periphery of a camshaft or the periphery of a crankshaft not illustrated of the internal combustion engine E, and the engine speed sensor 11 outputs signal pulses (TDC signal pulses) at predetermined crank angle positions at every 180° rotation of the crankshaft of the internal combustion engine E.

Also, an engine water temperature sensor 14 detecting the cooling water temperature Tw is arranged in the peripheral wall of a cylinder of a cylinder block of the internal combustion engine E filled with the cooling water, and a tank internal pressure sensor 15 detecting the tank internal pressure PT is arranged in the fuel tank T.

In the exhaust pipe 2 of the internal combustion engine E, an air-fuel ratio sensor ($O_2$ sensor) 12 is disposed, and detects the oxygen concentration of the exhaust gas.

Further, it is configured that the valve opening (throttle opening) of the throttle valve 4 is also detected by a throttle opening sensor 13.

All of the detected signals of various sensors described above are inputted to an electronic control unit ECU 18, and the ECU 18 performs calculation processes based on the information, outputs the various control signals to respective drive devices, and performs optimum control.

For example, the ECU 18 controls various operation states of the internal combustion engine of the feedback control operation range, the open loop control operation range and so on according to the oxygen concentration in the exhaust gas detected by the air-fuel sensor 12 based on the signals of the various sensors, calculates the fuel injection time $T_{OUT}$ of the fuel injection valve 5 synchronizing the TDC signal pulses according to the internal combustion engine operation state, performs duty-control of the fuel injection valve 5 based on the fuel injection time $T_{OUT}$, and supplies a required fuel supply amount to the internal combustion engine E.

In the internal combustion engine E provided with such electronic control type fuel injection device, a purge mechanism is arranged which treats the evaporated fuel inside the fuel tank T without leaking to the outside.

More specifically, a vent passage 20 communicating with the upper space inside the fuel tank T extends from the upper wall of the fuel tank T, and is connected to a canister C through a two-way valve 21 that appropriately maintains the internal pressure inside the fuel tank T.

In the canister C, activated carbon 22 is filled inside a container thereof leaving spaces in the top and the bottom, and it is configured that air is taken in from a draft tube 23 extended from the bottom wall.

The end terminal opening of the vent passage 20 is positioned inside the activated carbon 22, the two-way valve 21 opens when the evaporated fuel is generated inside the fuel tank T and the internal pressure rises, and the evaporated fuel is introduced to the canister C and is adsorbed and captured by the activated carbon 22.

From the upper wall of the canister C, a purge passage 24 extends so as to communicate with the upper space, and the terminal end thereof is connected to and communicates with the downstream side of the throttle body 3 in the intake pipe 1 of the internal combustion engine E through a purge control valve 25 of an intermediate on-off control type.

When the purge control valve 25 opens, atmospheric air is taken in from the draft tube 23 of the canister C by the negative pressure of the intake pipe 1, separates the fuel having been adsorbed by the activated carbon 22, is supplied to the intake pipe 1 as the mixture gas of air and fuel vapor, and is used for combustion in the internal combustion engine E.

The fuel vapor inside the fuel tank T is treated thus, and is prevented from being leaked to the outside and becoming a cause of the air pollution.

In the fuel supply control device of the internal combustion engine E as described above, it is configured that the ECU 18 inputs the detection signals from the various sensors, determines various internal combustion engine operation states such as the feedback control operation range according to the oxygen concentration of the exhaust gas, and the open loop control operation range of the time of a high load in fuel cut, and so on, calculates the fuel injection time $T_{OUT}$ of the fuel injection valve 5 synchronizing the TDC signal pulses from the engine speed sensor 11 by an expression below, controls the fuel supply amount, and maintains the air-fuel ratio in an optimum state.

$$T_{OUT}=T_i \cdot K_i \cdot K_{WOT} \cdot Ka+K_2$$

Here, $T_i$ is a reference value of the fuel injection time of the fuel injection valve 5, and is retrieved from a $T_i$ map set according to the engine speed Ne and the intake pipe absolute pressure $P_BA$.

Ka is an $O_2$ feedback correction factor (air-fuel ratio correction factor), and is set according to the oxygen concentration of the exhaust gas detected by the air-fuel ratio sensor 16 at the time of the feedback control.

$K_{WOT}$ is a fuel amount increase factor set to a value larger than 1.0 when the internal combustion engine E is in a high load (WOT) operation range.

$K_1$ and $K_2$ are other correction factor and correction variable calculated respectively according to various internal combustion engine parameter signals, and are decided to such predetermined values that various characteristics such as the fuel economy characteristic, the internal combustion engine acceleration characteristic, and the like according to the operation state of the internal combustion engine E can be optimized.

The ECU 18 controls valve opening of the fuel injection valve 5 based on the fuel injection time $T_{OUT}$ obtained as described above.

The present fuel supply control device by the ECU 18 includes fuel injection amount calculating means 51 calculating the fuel injection time $T_{OUT}$ of the fuel injection valve 5 and purge controlling means 63 controlling the purge control valve 25 as described above, and includes abnormality diagnosing means 70 diagnosing abnormality based on the air-fuel ratio correction factor Ka.

A control block diagram of the fuel supply control device by the ECU 18 is shown in FIG. 2.

To the ECU 18, the engine speed n detected by the engine speed sensor 11 and the throttle opening 9 detected by the throttle opening sensor 13, information detected by other operation state detecting means, and the oxygen concentration detected by the air-fuel ratio sensor 12 are inputted.

With reference to FIG. 2, the abnormality diagnosing means 70 stores beforehand an operation range map 72 that determines a threshold value of the air-fuel ratio correction factor Ka which is the abnormality diagnosis criterion, and operation range determining means 71 determines the present operation range from the present operation state according to the operation range map 72.

Figure 3:
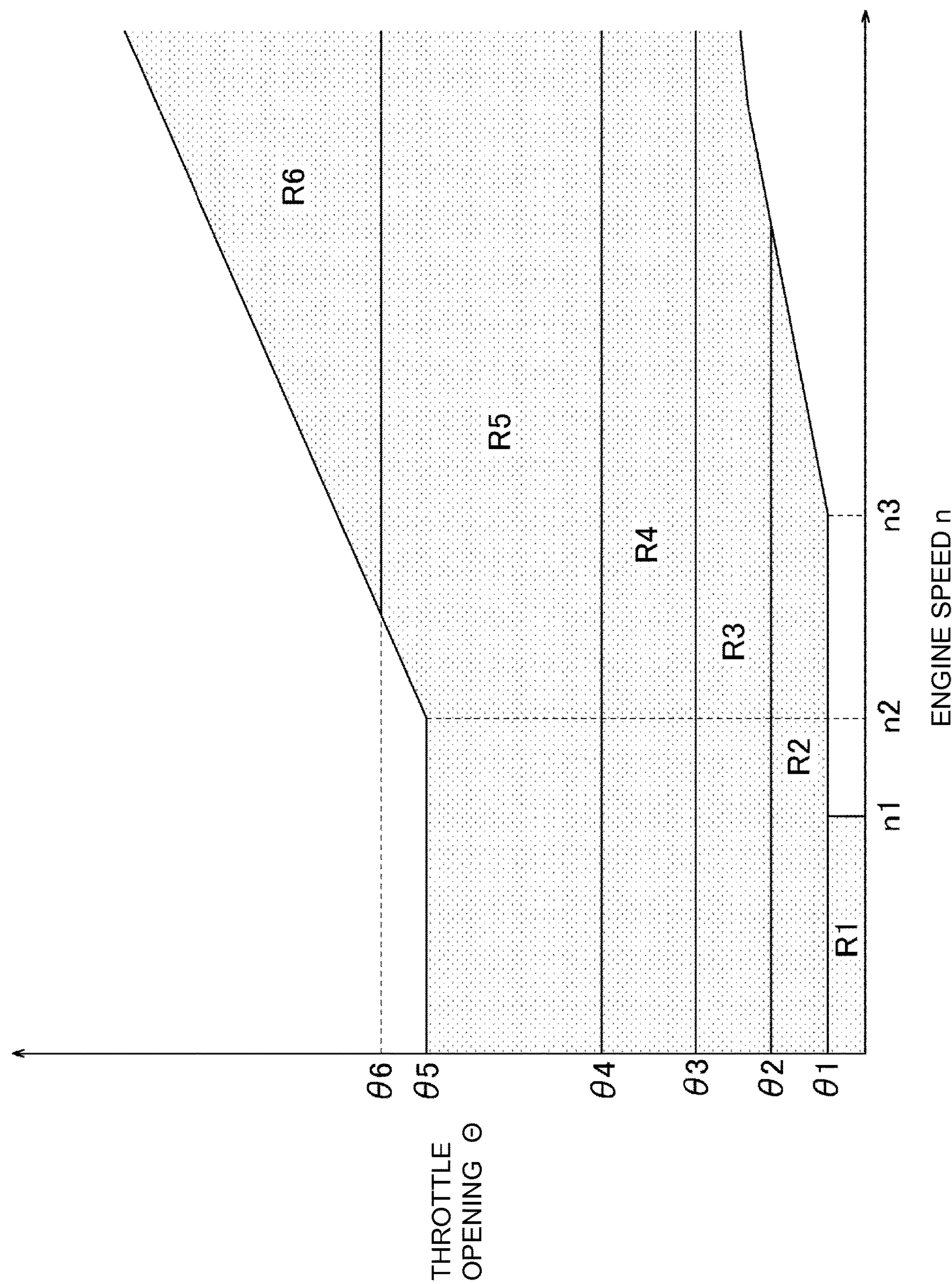
FIG. 3 is a map showing the operation range.

The operation range map 72 in the present abnormality diagnosing means 70 is shown in FIG. 3.

In the operation range map 72, six operation ranges R1 to R6 are shown dividedly in rectangular coordinates with the engine speed n in the axis of abscissas and with the throttle opening θ in the axis of ordinates.

These operation ranges R1 to R6 are within the feedback control operation range according to the oxygen concentration of the exhaust gas.

The operation ranges R1, R2, R3, R4, R5, R6 are determined in the order of the magnitude of the throttle opening θ, and the operation range R1 whose throttle opening θ is smallest corresponds to the idle operation range where the engine speed n is n1 or less.

The width of the throttle opening θ becomes larger in the order of the operation ranges R1, R2, R3, R4, R5, R6.

The reason of it is that, in the operation range of a lower load where the throttle opening θ is smaller, the variation of the air-fuel ratio correction factor Ka is larger and the disturbance affects more easily, and therefore higher accuracy is required for the fuel injection amount.

The operation ranges R1, R2, R3, R4 where the throttle opening θ is less than θ4 (θ<θ4) are ranges where the dispersion of the internal combustion engine E and adjustment of the idle screw largely affect.

The operation range R5 where the throttle opening θ is θ4 or more and less than θ6 (θ4≤θ<θ6) is a range where the dispersion of the throttle opening sensor 13 affects most largely.

The operation range R6 where the throttle opening θ is θ6 or more (θ≥θ6) is a range where the dispersion of the throttle opening sensor 13 and the dispersion of the internal combustion engine E hardly affect.

Thus, according to the operation ranges R1, R2, R3, R4, R5, R6 of the internal combustion engine, there is a difference in the degree of the effect of the dispersion of the throttle opening sensor 13, the dispersion of the internal combustion engine E, or adjustment of the idle screw and so on.

Therefore, considering such effect, in diagnosing the abnormality from the variation of the air-fuel ratio correction factor Ka, the threshold values (the lean side threshold value $S_L$, the rich side threshold value $S_R$) that become the diagnosis criteria are set beforehand for respective operation ranges R1, R2, R3, R4, R5, R6, and are stored in the abnormality diagnosing means 70 as an abnormality threshold value table 74.

With reference to FIG. 2, the operation range determining means 71 determines the present operation range R according to the operation range map 72 of FIG. 3 from the engine speed n of the engine speed sensor 11 and the throttle opening θ of the throttle opening sensor 13.

The present operation range R determined by the operation range determining means 71 is inputted to abnormality threshold value extracting means 73, and the abnormality threshold value extracting means 73 extracts the lean side threshold value $S_L$ and the rich side threshold value $S_R$ in the present operation range R from the abnormality threshold value table 74.

Figure 4:
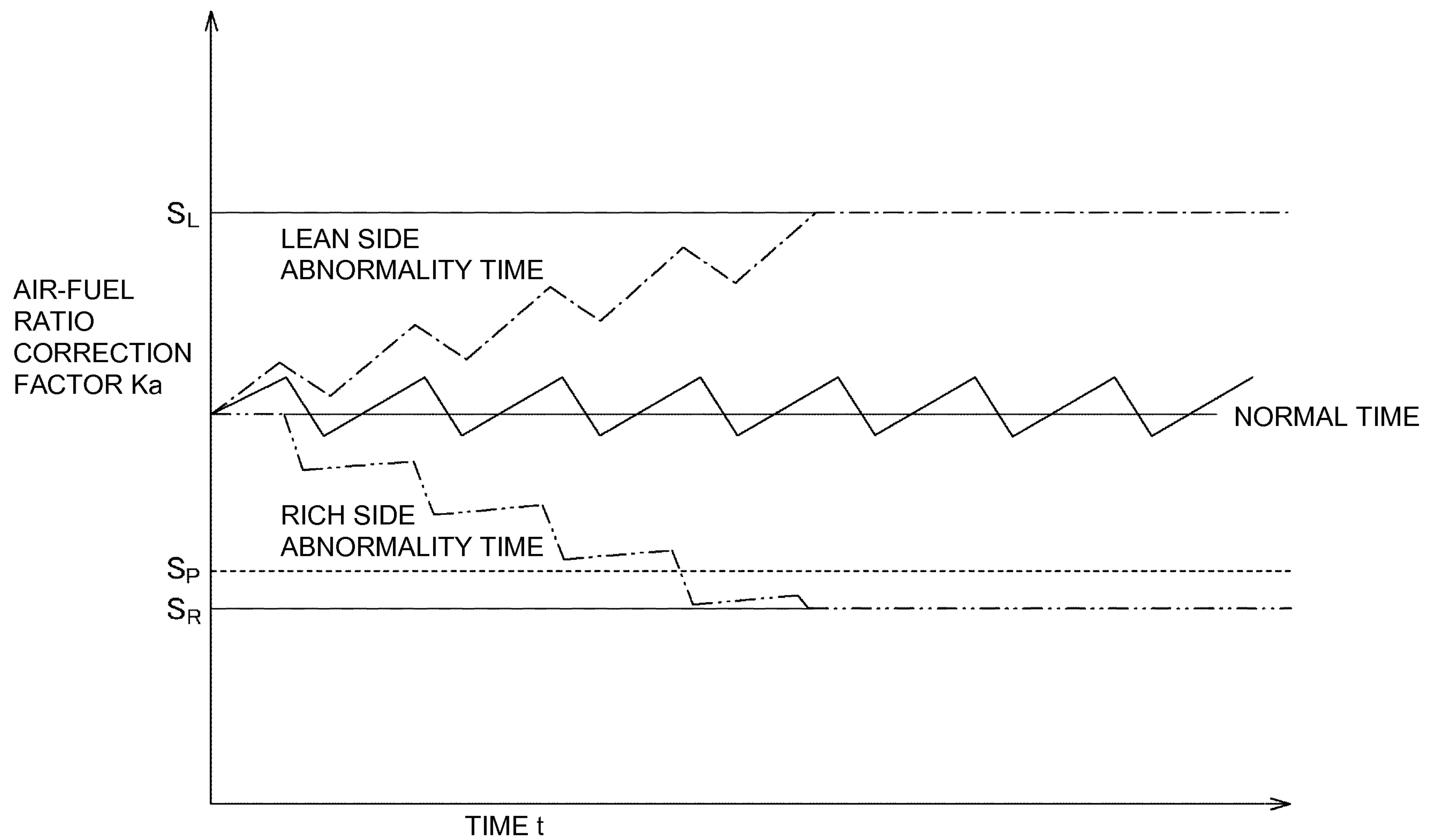
FIG. 4 is a graph showing an example of variation of the air-fuel ratio correction factor.

FIG. 4 shows an example of the variation of the air-fuel ratio correction factor Ka in a certain operation range.

With respect to the variation (solid line) of the air-fuel ratio correction factor Ka at the normal time when the average value of the air-fuel ratio correction factor Ka shows a constant value, the variation of the air-fuel ratio correction factor Ka at the lean side abnormal time (single-dot chain line) gradually rises in order to correct shifting of the air-fuel ratio to the lean side, and the variation of the air-fuel ratio correction factor Ka at the rich side abnormal time (two-dot chain line) gradually reduces in order to correct shifting of the air-fuel ratio to the rich side.

If the diagnosis criteria of the abnormality in this operation range are made the lean side threshold value $S_L$ and the rich side threshold value $S_R$, when gradually rising air-fuel ratio correction factor Ka at the lean side abnormal time exceeds the lean side threshold value $S_L$, it is determined to possibly be the lean side abnormality, and when gradually reducing air-fuel ratio correction factor Ka at the rich side abnormal time becomes less than the rich side threshold value $S_R$, it is determined to possibly be the rich side abnormality.

Abnormality information acquiring means 75 of the abnormality diagnosing means 70 inputs the lean side threshold value $S_L$ and the rich side threshold value $S_R$ in the present operation range R extracted by the abnormality threshold value extracting means 73, determines whether the air-fuel ratio correction factor Ka exceeds the lean side threshold value $S_L$ or is less than the rich side threshold value $S_R$, and acquires the abnormality information.

Here, with respect to the air-fuel ratio correction factor Ka, an air-fuel ratio correction factor Ka obtained by learning and calculation based on the air-fuel ratio detected by the air-fuel ratio sensor 16 in the process of calculating the fuel injection time $T_{OUT}$ by the fuel injection amount calculating means 51 is used.

When the air-fuel ratio correction factor Ka exceeds the lean side threshold value $S_L$, the abnormality information acquiring means 75 determines the possibility of the lean side abnormality, and raises "1" in the lean side abnormality flag $F_L$ as the abnormality information, whereas when the air-fuel ratio correction factor Ka is less than the rich side threshold value $S_R$, the abnormality information acquiring means 75 determines the possibility of the rich side abnormality, raises "1" in the rich side abnormality flag FR as the abnormality information, and outputs the same to next abnormality determining means 76 as the abnormality information.

Figure 5:
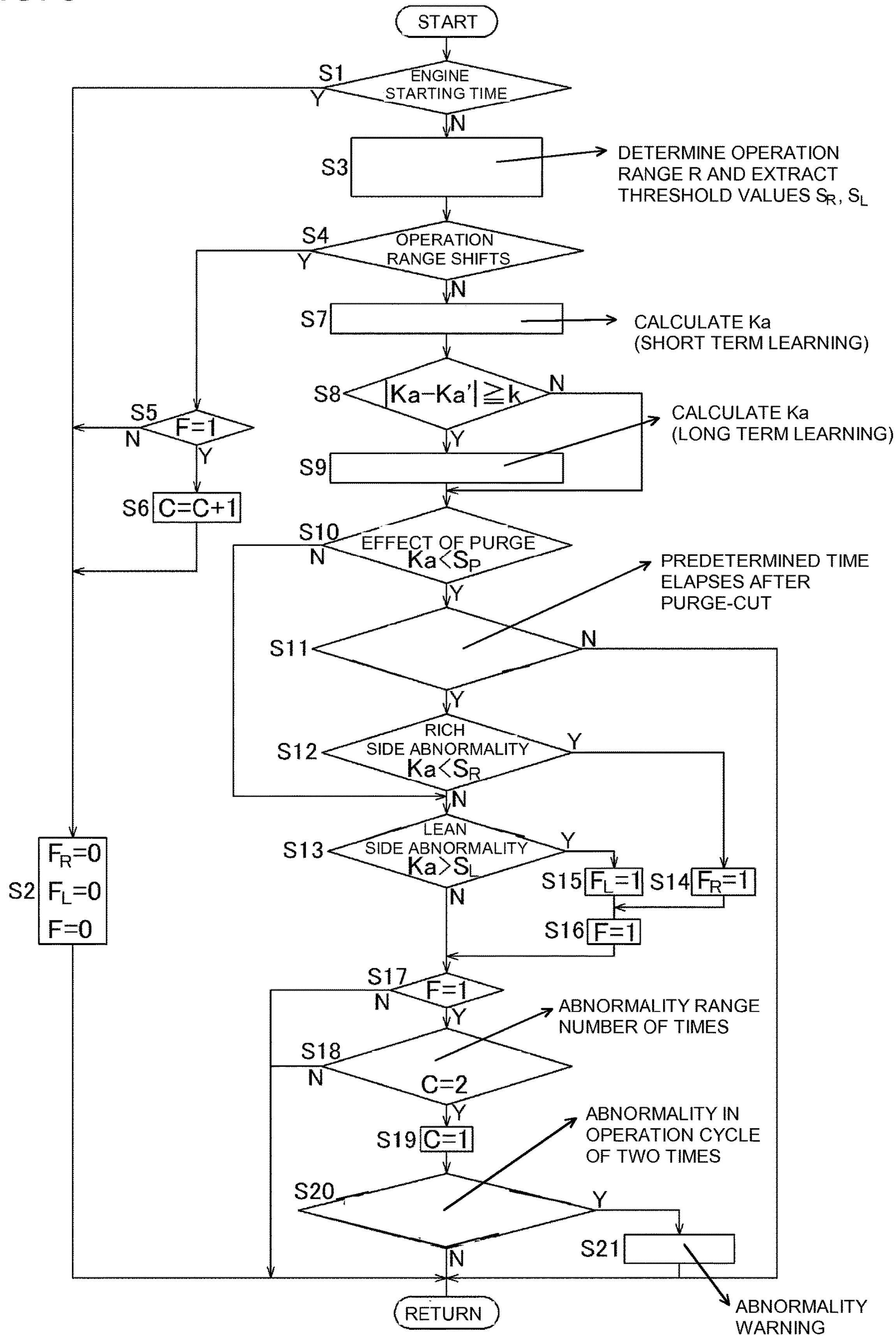
FIG. 5 is a drawing showing a flowchart of abnormality diagnosis control.

As described below according to the flowchart shown in FIG. 5, the abnormality determining means 76 performs the process of accurately diagnosing abnormality avoiding the effect of the temporary variation of the characteristics of the internal combustion engine E, and issues a warning driving warning means 80 such as a warning lamp and the like when it is determined to be the abnormality.

Although the fuel supply control device by the ECU 18 includes the purge controlling means 63 controlling the purge control valve 25, in order to accurately diagnosing the abnormality of the fuel supply system eliminating the effect of ejection of the evaporated fuel, the purge threshold value $S_P$ of the air-fuel ratio correction factor where the effect of purge is not negligible is set for each operation range, and it is configured to perform purge-cut when the air-fuel ratio correction factor Ka exceeds (is less than) the purge threshold value $S_P$.

More specifically, the ECU 18 sets the purge threshold value $S_P$ beforehand for respective operation ranges R1, R2, R3, R4, R5, R6 and stores the same as a purge threshold value table 62, and purge threshold value extracting means 61 extracts the purge threshold value $S_P$ in the present operation range R determined by the operation range determining means 71.

Also, the purge controlling means 63 inputs the purge threshold value $S_P$ in the present operation range R extracted by the purge threshold value extracting means 61, determines whether the air-fuel ratio correction factor Ka inputted from the fuel injection amount calculating means 51 is less than (exceeds) the purge threshold value $S_P$, when the air-fuel ratio correction factor Ka is less than the purge threshold value $S_P$, drives the purge control valve 25, and performs purge-cut.

With reference to FIG. 4 that shows the variation of the air-fuel ratio correction factor Ka, the purge threshold value Sp is positioned slightly on the upper side of the rich side threshold value $S_R$, when the gradually reducing air-fuel ratio correction factor Ka at the rich side abnormality time becomes less than the purge threshold value $S_P$, purge-cut is performed, and abnormality diagnosis is continued in a state the effect of the purge is eliminated.

Also, the purge threshold value $S_P$ is not set in the operation ranges R5, R6 of a high load, and is set in the operation ranges R2, R3, R4.

Next, the control procedure of the abnormality diagnosis will be described according to the flowchart of the abnormality diagnosis control shown in FIG. 5.

First, whether the internal combustion engine E is in starting or not is determined (step 1), if yes, the process jumps to step 2, all of the lean side flag $F_L$, the rich side flag $F_R$, and the abnormality flag F that raises "1" when at least one of the lean side and the rich side is possibly abnormal are made to be "0", and the process goes through the present routine.

When it is determined in step 1 that the internal combustion engine E is not in starting but the internal combustion engine E is in operation after starting, the process proceeds to step 3, the operation range determining means 71 determines the present operation range R according to the operation range map 72, and the abnormality threshold value extracting means 73 extracts the lean side threshold value $S_L$ and the rich side threshold value $S_R$ in the present operation range R from the abnormality threshold value table 74.

In next step 4, whether the operation range has been shifted or not is determined.

When the operation range has been shifted, the process jumps to step 5, whether "1" has been raised or not in the abnormality flag is determined, if no, the process directly proceeds to step 2. If "1" has been raised, the process proceeds to step 6, the abnormality range number of times C for counting the number of times of different operation ranges which are possibly abnormal is incremented (C=C+1), and the process proceeds to step 2 and goes through the present routine.

When it is determined that the operation range has not been shifted in step 4, the process proceeds to step 7, and the air-fuel ratio correction factor Ka is calculated by short term learning.

This air-fuel ratio correction factor Ka is obtained by adding the short term learned value to the air-fuel ratio detected by the air-fuel ratio sensor 12 and averaging the same.

When the process proceeds to next step 8, whether the difference of the air-fuel ratio correction factor Ka calculated this time and the air-fuel ratio correction factor Ka' of the previous time amounts a predetermined value k or more is determined. When the difference is the predetermined value k or more, the process proceeds to step 9, the air-fuel ratio correction factor Ka is calculated by long term learning and the process proceeds to step 10, however when the difference is less than the predetermined value k, the process proceeds directly to step 10.

The air-fuel ratio correction factor Ka calculated by long term learning is used as an initial value of the air-fuel ratio correction factor Ka in step 4 when the operation range has been shifted and so on.

In step 10, whether the air-fuel ratio correction factor Ka calculated is less than (exceeds) the purge threshold value $S_P$ is determined (refer to FIG. 4). When the air-fuel ratio correction factor Ka calculated is less than the purge threshold value $S_P$ ($Ka<S_P$), it is presumed that the air-fuel ratio correction factor Ka dropped by ejection of the evaporated fuel, in order to avoid the effect of the purge, the process proceeds to step 11, and whether a predetermined time allowing to eliminate the effect of the purge after performing the purge-cut has elapsed is determined.

More specifically, until the predetermined time has elapsed after performing the purge-cut, because there is an effect of the purge, the process goes through the present routine from step 11. After the predetermined time has elapsed when the effect of the purge is eliminated, the process proceeds from step 11 to step 12 and enters abnormality diagnosis in a state the effect of the purge is eliminated, whether rich side abnormality is possible that is whether or not the air-fuel ratio correction factor Ka is less than the rich side threshold value $S_R$ is determined, and abnormality diagnosis is started.

When it is determined that the air-fuel ratio correction factor Ka is less than the rich side threshold value $S_R$ ($Ka<S_R$) in step 12, the possibility of the rich side abnormality is presumed, the process jumps to step 14, "1" is raised in the rich side abnormality flag FR, then the process proceeds to step 16, "1" is raised in the abnormality flag F also, and the process proceeds to step 17.

When it is determined that the air-fuel ratio correction factor Ka is equal to or greater than the purge threshold value $S_P$ ($Ka \geq S_P$) in step 10, the process jumps to step 13, whether the lean side abnormality is possible that is whether or not the air-fuel ratio correction factor Ka exceeds the lean side threshold value $S_L$ is determined.

When it is determined that the air-fuel ratio correction factor Ka exceeds the lean side threshold value $S_L$ ($Ka>S_L$) in step 13, the possibility of the lean side abnormality is presumed, the process jumps to step 15, "1" is raised in the lean side abnormality flag $F_L$, the process proceeds to step 16, "1" is raised in the abnormality flag F also, and the process proceeds to step 17.

When there is no possibility of the rich side abnormality and no possibility of the lean side abnormality, the process proceeds from step 13 to step 17, and "1" is not raised in any of the rich side abnormality flag $F_R$, the lean side abnormality flag $F_L$ and the abnormality flag F.

In step 17, whether or not "1" has been raised in the abnormality flag F is determined, when "1" has not been raised in the abnormality flag F (F=0), it is presumed that there is no possibility of abnormality in both the lean side and the rich side, and the process goes through this routine.

When it is determined in step 17 that "1" has been raised in the abnormality flag F (F=1), the process proceeds to step 18, whether or not the abnormality range number of times C for counting the number of times of different operation ranges which are possibly abnormal is "2" (C=2) is determined.

In other words, it is determined whether or not "1" has been raised in the abnormality flag F in each of different two operation ranges.

When it is determined in step 18 that the abnormality range number of times C is not "2", the abnormality range number of times C is either "0" or "1", and, this time, the process goes through the present routine.

Also, shifting of the operation range is determined in step 4 described above, the process proceeds to step 5, and, when "1" has been raised in the abnormality flag F, the abnormality range number of times C is incremented in step 6.

When it is determined in step 18 that the abnormality range number of times C is "2" (C=2) which means when it is determined that "1" has been raised in the abnormality flag F in each of different two operation ranges and the possibility of the abnormality has increased, the process proceeds to step 19, the abnormality range number of times C is brought back to "1", and the process proceeds to step 20.

In step 20, it is determined whether or not there is the possibility of abnormality in operation cycle of two times.

Only after it is determined that "1" has been raised in the abnormality flag F in each of different two operation ranges and the possibility of abnormality has increased in the operation cycle of one time after the internal combustion engine E is started and until the operation is stopped and that "1" has been raised in the abnormality flag F in each of two different operation ranges and the possibility of abnormality has increased in the second operation cycle also, the process proceeds to step 21, it is determined that the fuel supply system is abnormal, and an abnormality warning is issued driving the warning means 80 such as a warning lamp.

When it is determined that there is no possibility of abnormality in the operation cycle of two times in step 20, the process goes through this routine.

As described above, the present abnormality diagnosis device for a fuel supply system includes the threshold value table 74 in which the lean side threshold value $S_L$ and the rich side threshold value $S_R$ of the air-fuel ratio correction factor Ka for determining the abnormality of the fuel supply system are set beforehand for every operation range R, the abnormality is determined based on the abnormality information whether or not the air-fuel ratio correction factor Ka has exceeded the lean side threshold value $S_L$ or the rich side threshold value $S_R$ extracted from the threshold value table 74 according to the operation state, and therefore the abnormality of the fuel supply system can be accurately and quickly diagnosed by the determination criteria according to the operation range R with different characteristics of the internal combustion engine.

It is configured that, when the air-fuel ratio correction factor Ka exceeds the lean side threshold value $S_L$ or the rich side threshold value $S_R$, "1" is raised in the lean side abnormality flag $F_L$ or the rich side abnormality flag $F_R$ and "1" is raised in the abnormality flag F as the abnormality information, and the possibility of abnormality is determined by whether or not the abnormality flag F has been raised in two different operation ranges R, and therefore the abnormality of the fuel supply system can be more accurately diagnosed avoiding the effect by the temporary change of the characteristics of the internal combustion engine.

Further, it is also possible to determine the abnormality and to issue a warning when the abnormality flag F has been raised in two different operation ranges R.

Also, because the warning of the abnormality is issued by the warning means 80 only after the abnormality determining means 76 has determined the abnormality at each operation cycle of two times, the abnormality can be determined and the warning can be issued after diagnosing the abnormality of the fuel supply system more accurately avoiding the effect by the temporary change of the characteristics of the internal combustion engine.

The purge threshold value $S_P$ of the air-fuel ratio correction factor Ka where the effect of the purge is not negligible is set for every operation range R, the purge controlling means 63 performs the purge-cut when the air-fuel ratio correction factor Ka exceeds (is less than) the purge threshold value $S_P$, therefore when the effect of ejection of the evaporated fuel generated in the fuel system on the air-fuel ratio correction factor is not negligible, the abnormality of the fuel supply system is diagnosed after performing the purge-cut, and thereby the abnormality of the fuel supply system can be accurately diagnosed avoiding the effect of ejection of the evaporated fuel.

In which of the lean side or the rich side of the air-fuel ratio correction factor Ka the abnormality of the fuel supply system has occurred can be known by the state of the lean side abnormality flag $F_L$ or the rich side abnormality flag $F_R$, and therefore the cause of the abnormality can be investigated quickly.

Also, with respect to the abnormality of the fuel supply system, various causes are conceivable such as clogging of the fuel injection valve, leakage of the fuel, occurrence of the abnormality in opening/closing motion of the throttle valve.

Although the abnormality was determined by whether or not the abnormality flag F had been raised in two different operation ranges R in the embodiments described above, it is also possible to determine the abnormality by whether or not the abnormality flag F has been raised in plural operation ranges R of three or more. In such a case, although the accuracy of the abnormality diagnosis can be increased, the diagnosis result of the abnormality comes to be delayed.

Further, although it is configured that the warning means 80 issues the warning of the abnormality when the abnormality determining means 76 has determined the abnormality in each operation cycle of two times, it is also possible to be configured that the warning means 80 issues the warning only after the abnormality determining means 76 has determined the abnormality in each operation cycle of plural times of three times or more. In such a case, although the accuracy of the abnormality diagnosis can be increased, quick diagnosis becomes difficult.

According to a first feature of the embodiment of the present invention, there is provided a diagnosis device for a fuel supply system, including:

operation state detecting means (11, 13) that detect the operation state of an internal combustion engine;

an air-fuel ratio sensor (12) that is arranged in an exhaust system of the internal combustion engine and detects the air-fuel ratio; and fuel injection amount calculating means (51) that calculates the fuel injection amount supplied to the internal combustion engine by a fuel injection valve based on detected information of the operation state detecting means (11, 13), in which feedback is performed by the air-fuel ratio correction factor (Ka) according to the air-fuel ratio detected by the air-fuel ratio sensor (12), the fuel injection amount is corrected, and fuel supply control is performed, wherein the diagnosis device for a fuel supply system further includes:

a threshold value table (74) in which the operation range is divided based on an engine speed (n) and a throttle opening (θ), and a lean side threshold value ($S_L$) and a rich side threshold value ($S_R$) of an air-fuel ratio correction factor (Ka) determining abnormality of the fuel supply system is set beforehand for every operation range (R);

abnormality information acquiring means (75) that determines whether or not the air-fuel ratio correction factor (Ka) has exceeded the lean side threshold value ($S_L$) or the rich side threshold value ($S_R$) extracted from the threshold value table (74) according to the operation state, and acquires abnormality information; and abnormality determining means (76) that determines abnormality based on the abnormality information acquired by the abnormality information acquiring means (75).

A second feature of the embodiment of the present invention is that, in the diagnosis device for a fuel supply system according to the first feature of the embodiment of the present invention, the abnormality information acquiring means (75) raises an abnormality flag (F) as abnormality information when the air-fuel ratio correction factor (Ka) has exceeded the lean side threshold value ($S_L$) or the rich side threshold value ($S_R$), and the abnormality determining means (76) determines abnormality based on whether or not the abnormality flag (F) has been raised by a predetermined number of times of two times or more.

A third feature of the embodiment of the present invention is that, in the diagnosis device for a fuel supply system according to the second feature of the embodiment of the present invention, the abnormality determining means (76) determines abnormality based on whether or not the abnormality flag (F) has been raised in at least two different operation ranges (R).

A fourth feature of the embodiment of the present invention is that, in the diagnosis device for a fuel supply system according to any one of the first to third features of the embodiment of the present invention, a warning is issued by warning means (80) when the abnormality determining means (76) has determined abnormality in each operation cycle of a predetermined number of times of two times or more.

A fifth feature of the embodiment of the present invention is that, in the diagnosis device for a fuel supply system according to any one of the first to fourth features of the embodiment of the present invention, purge controlling means (63) that controls ejection of evaporated fuel generated in a fuel system to an intake system is provided, a purge threshold value ($S_P$) of the air-fuel ratio correction factor (Ka) at which the effect of purge is not negligible is set for every operation range (R), and the purge controlling means (63) performs purge-cut when the air-fuel ratio correction factor (Ka) exceeds the purge threshold value ($S_P$).

With the diagnosis device for a fuel supply system according to the first feature of the embodiment of the present invention, the threshold value table (74) is provided in which the operation range is divided based on the engine speed (n) and the throttle opening (θ), and the lean side threshold value ($S_L$) and the rich side threshold value ($S_R$) of the air-fuel ratio correction factor (Ka) determining abnormality of the fuel supply system is set beforehand for every operation range (R), abnormality is determined based on the abnormality information of whether or not the air-fuel ratio correction factor (Ka) has exceeded the lean side threshold value ($S_L$) or the rich side threshold value ($S_R$) extracted from the threshold value table (74) according to the operation state, and therefore the abnormality of the fuel supply system can be diagnosed accurately and quickly by the determination criteria according to the operation range (R) with different characteristics of the internal combustion engine.

With the diagnosis device for a fuel supply system according to the second feature of the embodiment of the present invention, the abnormality flag (F) is raised as the abnormality information when the air-fuel ratio correction factor (Ka) has exceeded the lean side threshold value ($S_L$) or the rich side threshold value ($S_R$), the abnormality determining means (76) determines abnormality based on whether or not the abnormality flag (F) has been raised by a predetermined number of times of two times or more, and therefore the abnormality of the fuel supply system can be diagnosed accurately avoiding the effect of temporary variation of the characteristics of the internal combustion engine.

With the diagnosis device for a fuel supply system according to the third feature of the embodiment of the present invention, because the abnormality is determined based on whether or not the abnormality flag (F) has been raised in at least two different operation ranges (R), the abnormality of the fuel supply system can be diagnosed more accurately avoiding the effect of temporary variation of the characteristics of the internal combustion engine.

With the diagnosis device for a fuel supply system according to the fourth feature of the embodiment of the present invention, because a warning is issued by the warning means (80) when the abnormality determining means (76) has determined the abnormality in each operation cycle of a predetermined number of times of two times or more, the abnormality can be determined and a warning can be issued after the abnormality of the fuel supply system is diagnosed more accurately avoiding the effect of temporary variation of the characteristics of the internal combustion engine.

With the diagnosis device for a fuel supply system according to the fifth feature of the embodiment of the present invention, the purge controlling means (63) that controls ejection of the evaporated fuel generated in the fuel system to the intake system is provided, the purge threshold value ($S_P$) of the air-fuel ratio correction factor (Ka) at which the effect of purge is not negligible is set for every operation range (R), the purge controlling means (63) performs purge-cut when the air-fuel ratio correction factor (Ka) exceeds (is less than) the purge threshold value ($S_P$), therefore by diagnosing the abnormality of the fuel supply system after performing purge-cut when the effect by ejection of the evaporated fuel generated in the fuel system on the air-fuel ratio correction factor is not negligible, the effect of ejection of the evaporated fuel can be eliminated, and abnormality of the fuel supply system can be accurately diagnosed.

Obviously, numerous modifications and variations of the present invention are possible in light of the above teachings. It is therefore to be understood that within the scope of the appended claims, the invention may be practiced otherwise than as specifically described herein.

What is claimed is:

1. A diagnosis device for a fuel supply system, the diagnosis device comprising:

operation state sensor that detects the operation state of an internal combustion engine;

an air-fuel ratio sensor that is arranged in an exhaust system of the internal combustion engine and detects an air-fuel ratio; and an electronic control unit configured to:

calculate the fuel injection amount supplied to the internal combustion engine by a fuel injection valve based on detected information of the operation state sensor, in which feedback is performed by an air-fuel ratio correction factor according to the air-fuel ratio detected by the air-fuel ratio sensor, the fuel injection amount is corrected, and fuel supply control is performed, wherein the electronic control unit is further configured to:

store a threshold value table in which operation ranges are divided based on an engine speed and a throttle opening, and a lean side threshold value and a rich side threshold value of the air-fuel ratio correction factor determining abnormality of the fuel supply system is set beforehand for each of the operation ranges;

determine when the air-fuel ratio correction factor has exceeded the lean side threshold value or the rich side threshold value extracted from the threshold value table according to the operation state, and acquire abnormality information;

determine abnormality based on the abnormality information, the abnormality determined when an abnormality flag has been raised by a predetermined number of at least two times, the abnormality flag being raised when the air-fuel ratio correction factor has exceeded the lean side threshold value or the rich side threshold value; and control supply of evaporated fuel generated in a fuel system to an intake system of the internal combustion engine to control purge by purge-cut, wherein a rich side purge threshold value of the air-fuel ratio correction factor is set for each of the operation ranges, wherein a lean side purge threshold value of the air-fuel ratio correction factor is set for each of the operation ranges, wherein a third purge threshold value of the air-fuel ratio correction factor is set for each of the operation ranges, the third purge threshold value being set toward the lean side purge threshold value relative to the rich side purge threshold value, wherein the electronic control unit starts performing the purge-cut when the air-fuel ratio correction factor exceeds the third purge threshold value, and wherein the electronic control unit raises a flag as purge-cut information when the air-fuel ratio correction factor has exceeded the rich side purge threshold value or the lean side purge threshold value.

2. The diagnosis device according to claim 1, wherein a warning is issued by a warning lamp when the electronic control unit has determined abnormality in each operation cycle of a predetermined number of times of two times or more.

3. The diagnosis device according to claim 1, wherein the electronic control unit determines the abnormality of the fuel supply system on the basis of the operation of the fuel injection valve arranged solely upstream of an intake valve.

4. The diagnosis device according to claim 1, wherein the lean side threshold value and the rich side threshold value are extracted based on a current engine speed and a current throttle opening.

5. The diagnosis device according to claim 1, wherein the a predetermined number is at least three times.

6. A diagnosis device for a fuel supply system, the diagnosis device comprising:

operation state detecting means for detecting an operation state of an internal combustion engine;

an air-fuel ratio sensor that is arranged in an exhaust system of the internal combustion engine and that is configured to detect an air-fuel ratio; and fuel injection amount calculating means for calculating a fuel injection amount supplied to the internal combustion engine by a fuel injection valve based on detected information of the operation state detecting means, in which feedback is performed by an air-fuel ratio correction factor according to the air-fuel ratio detected by the air-fuel ratio sensor, the fuel injection amount is corrected, and fuel supply control is performed, wherein the diagnosis device further comprises:

a threshold value table in which operation ranges are divided based on an engine speed and a throttle opening, and a lean side threshold value and a rich side threshold value of the air-fuel ratio correction factor determining abnormality of the fuel supply system is set beforehand for every operation range of the operation ranges;

abnormality information acquiring means for determining when the air-fuel ratio correction factor has exceeded the lean side threshold value or the rich side threshold value extracted from the threshold value table according to the operation state, and acquires abnormality information; and abnormality determining means for determining abnormality based on the abnormality information acquired by the abnormality information acquiring means;

wherein the abnormality information acquiring means raises an abnormality flag as abnormality information when the air-fuel ratio correction factor has exceeded the lean side threshold value or the rich side threshold value, wherein the abnormality determining means determines abnormality based on when the abnormality flag has been raised by a predetermined number of at least two times, wherein the diagnosis device further comprises purge controlling means for controlling supply of evaporated fuel generated in a fuel system to an intake system of the internal combustion engine to control purge by purge-cut, wherein a rich side purge threshold value of the air-fuel ratio correction factor is set for each of the operation ranges, wherein a lean side purge threshold value of the air-fuel ratio correction factor is set for each of the operation ranges, wherein a third purge threshold value of the air-fuel ratio correction factor is set for each of the operation ranges, the third purge threshold value being set toward the lean side purge threshold value relative to the rich side purge threshold value, wherein the purge controlling means starts performing then purge-cut when the air-fuel ratio correction factor exceeds the third purge threshold value, and the purge controlling means raises a flag as purge-cut information when the air-fuel ratio correction factor has exceeded the rich side purge threshold value or the lean side purge threshold value.

7. The diagnosis device for a fuel supply system according to claim 6, wherein when the air-fuel ratio correction factor does not exceed the third purge threshold value, the purge controlling means starts determining whether the air-fuel ratio correction factor exceeds the lean side purge threshold value, and a purge-cut flag is raised when the air-fuel ratio correction factor exceeds the lean side purge threshold value.

8. The diagnosis device for a fuel supply system according to claim 6, wherein when the air-fuel ratio correction factor exceeds the third purge threshold value, the purge controlling means starts determining whether the air-fuel ratio correction factor exceeds the rich side purge threshold value, and an abnormality flag is raised when the air-fuel ratio correction factor exceeds the rich side purge threshold value after lapse of a predetermined time.

9. A diagnosis device for a fuel supply system, the diagnosis device comprising:

operation state detecting means for detecting an operation state of an internal combustion engine;

an air-fuel ratio sensor that is arranged in an exhaust system of the internal combustion engine and that is configured to detect an air-fuel ratio; and fuel injection amount calculating means for calculating a fuel injection amount supplied to the internal combustion engine by a fuel injection valve based on detected information of the operation state detecting means, in which feedback is performed by an air-fuel ratio correction factor according to the air- fuel ratio detected by the air-fuel ratio sensor, the fuel injection amount is corrected, and fuel supply control is performed, wherein the diagnosis device further comprises:

a threshold value table in which operation ranges are divided based on an engine speed and a throttle opening, and a lean side threshold value and a rich side threshold value of the air-fuel ratio correction factor determining abnormality of the fuel supply system is set beforehand for each operation range of the operation ranges;

abnormality information acquiring means for determining when the air-fuel ratio correction factor has exceeded the lean side threshold value or the rich side threshold value extracted from the threshold value table according to the operation state, and acquires abnormality information; and abnormality determining means for determining abnormality based on the abnormality information acquired by the abnormality information acquiring means;

wherein the abnormality information acquiring means raises an abnormality flag as abnormality information when the air-fuel ratio correction factor has exceeded the lean side threshold value or the rich side threshold value, wherein the abnormality determining means determines abnormality based on when the abnormality flag has been raised by a predetermined number of at least two times, wherein the diagnosis device further comprises purge controlling means for controlling supply of evaporated fuel generated in a fuel system to an intake system of the internal combustion engine to control purge by purge-cut, wherein a rich side purge threshold value of the air-fuel ratio correction factor is set for each of the operation ranges, wherein a lean side purge threshold value of the air-fuel ratio correction factor is set for each of the operation ranges, wherein a third purge threshold value of the air-fuel ratio correction factor is set for each of the operation ranges, the third purge threshold value being set toward the lean side purge threshold value relative to the rich side purge threshold value, wherein the purge controlling means starts performing then purge-cut when the air-fuel ratio correction factor exceeds the third purge threshold value, and the purge controlling means raises a flag as purge-cut information when the air-fuel ratio correction factor has exceeded the rich side purge threshold value or the lean side purge threshold value.

10. The diagnosis device for a fuel supply system according to claim 9, wherein when the air-fuel ratio correction factor does not exceed the third purge threshold value, the purge controlling means starts determining whether the air-fuel ratio correction factor exceeds the lean side purge threshold value, and a purge-cut flag is raised when the air-fuel ratio correction factor exceeds the lean side purge threshold value.

11. The diagnosis device for a fuel supply system according to claim 9, wherein when the air-fuel ratio correction factor exceeds the third purge threshold value, the purge controlling means starts determining whether the air-fuel ratio correction factor exceeds the rich side purge threshold value, and an abnormality flag is raised when the air-fuel ratio correction factor exceeds the rich side purge threshold value after lapse of a predetermined time.

* * * * *